United States Patent
Yi et al.

(10) Patent No.: US 7,620,061 B2
(45) Date of Patent: Nov. 17, 2009

(54) METHOD FOR SCHEDULING TRANSMISSION OF MBMS DATA IN UMTS

(75) Inventors: Seung-June Yi, Seoul (KR); Young-Dae Lee, Gyeonggi-Do (KR); So-Young Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 772 days.

(21) Appl. No.: 10/639,756

(22) Filed: Aug. 13, 2003

(65) Prior Publication Data

US 2004/0105402 A1 Jun. 3, 2004

(30) Foreign Application Priority Data

Aug. 14, 2002 (KR) .................. 10-2002-0048263

(51) Int. Cl.
*H04J 3/26* (2006.01)
(52) U.S. Cl. ..................... 370/432; 370/437
(58) Field of Classification Search .......... 370/328, 370/347, 336–337, 432, 437, 442; 455/450–451, 455/452.1, 452.2
See application file for complete search history.

(56) References Cited

U.S. PATENT DOCUMENTS

| 6,795,419 B2* | 9/2004 | Parantainen et al. ........ 370/337 |
| 2002/0135698 A1* | 9/2002 | Shinohara ................... 348/473 |
| 2003/0174645 A1* | 9/2003 | Paratainen et al. .......... 370/229 |
| 2003/0207696 A1* | 11/2003 | Willenegger et al. ........ 455/522 |
| 2004/0081192 A1* | 4/2004 | Koulakiotis et al. ......... 370/432 |
| 2004/0116125 A1* | 6/2004 | Terry ........................... 455/450 |

FOREIGN PATENT DOCUMENTS

| CN | 1653843 A | 8/2005 |
| EP | 1 006 740 A2 | 6/2000 |
| EP | 1 085 717 A1 | 3/2001 |
| EP | 1 361 770 A1 | 11/2003 |
| JP | 2001-084234 | 3/2001 |
| JP | 2001-218245 | 8/2001 |
| JP | 2001-308856 | 11/2001 |
| JP | 2002-111672 A | 4/2002 |
| JP | 2004-187327 A | 7/2004 |

(Continued)

OTHER PUBLICATIONS

Russian Office Action dated Oct. 26, 2006.

(Continued)

*Primary Examiner*—Nguyen Vo
(74) *Attorney, Agent, or Firm*—McKenna Long & Aldridge LLP

(57) ABSTRACT

A multimedia service of a UMTS (Universal Mobile Telecommunications System) is disclosed. When UTRAN provides an MBMS service, it designates time at which each data for MBMS service is transmitted and transmits the corresponding time information to a terminal group which desires to receive a specific MBMS service. Accordingly, a terminal of the terminal group receives the MBMS service data during a section of the corresponding time information and also receives a control signal or other service than the MBMS service at other time.

30 Claims, 7 Drawing Sheets

FOREIGN PATENT DOCUMENTS

| | | |
|---|---|---|
| KR | 1020000033183 | 6/2000 |
| KR | 1020010096484 | 11/2001 |
| KR | 1020020009591 | 2/2002 |
| KR | 1020020044306 | 6/2002 |
| WO | WO 02/45314 A2 | 6/2002 |
| WO | WO 03/036871 A1 | 5/2003 |
| WO | WO 03/096149 A2 | 11/2003 |
| WO | WO 2004/017661 A1 | 2/2004 |

OTHER PUBLICATIONS

Chinese Search Report dated Dec. 29, 2006 (including English translation).

"3$^{rd}$ Generation Partnership Project; Technical Specification Group Radio Access Network; Radio Interface for Broadcast/Multicast Services (Release 1999)"; 3GPP TR 24.925 V3.4.0 (Mar. 2001), XP-002191629; pp. 1-31.

\* cited by examiner

FIG.3
BACKGROUND ART

| 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|----|----|----|----|----|----|----|----|
|   |   | CTCH | CTCH |   |   |   |   | CTCH | CTCH |   |   |   |   | CTCH | CTCH |   |   |

FIG.4
BACKGROUND ART

| Message Type |
|---|
| Start point of next CBS schedule period |
| Length of next CBS schedule period |
| New message bitmap |
| Message description |

FIG.5

| MBMS Service 1 | MBMS Service 2 | MBMS Service 1 | |

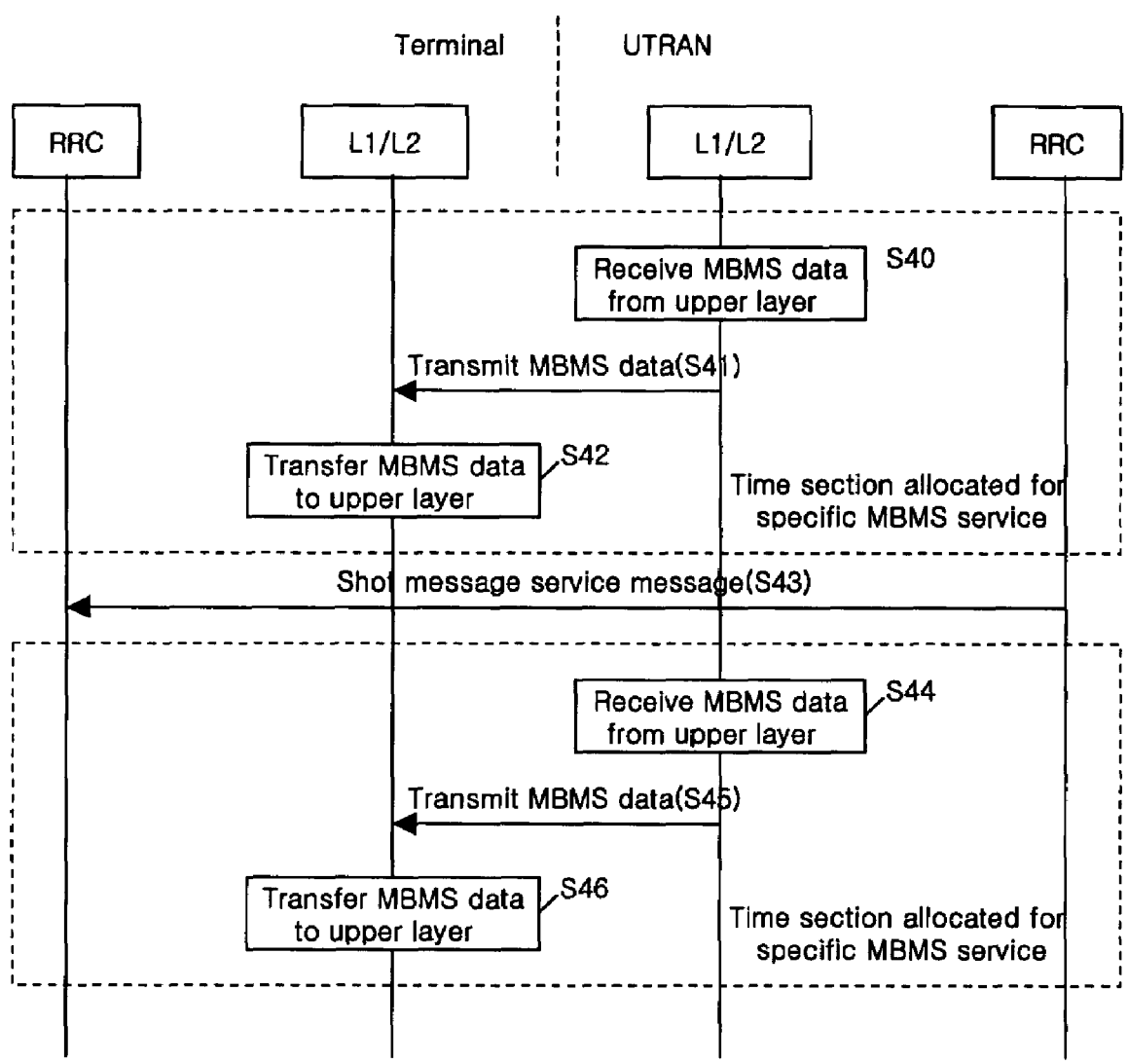

METHOD FOR SCHEDULING TRANSMISSION OF MBMS DATA IN UMTS

BACKGROUND OF THE INVENTION

1. Field of the Invention

The present invention relates to a multimedia broadcast/multicast service (MBMS) of a UMTS (Universal Mobile Telecommunications System) and, more particularly, to a method for scheduling transmission of MBMS data.

2. Description of the Background Art

A universal mobile telecommunications system (UMTS) is a third generation mobile communication system that has evolved from a standard known as Global System for Mobile communications (GSM). This standard is a European standard which aims to provide an improved mobile communication service based on a GSM core network and wideband code division multiple access (W-CDMA) technology.

FIG. 1 shows a network structure of a general UMTS.

As shown in FIG. 1, the UMTS is roughly divided into a terminal, a UTRAN and a core network.

The UTRAN includes one or more radio network subsystems (RNS). Each RNS includes an RNC and one or more Node Bs managed by the RNCs.

Node Bs managed by the RNCs, receive information sent by the physical layer of a terminal (e.g., mobile station, user equipment and/or subscriber unit) through an uplink, and transmit data to a terminal through a downlink. Node Bs, thus, operate as access points of the UTRAN for terminal.

The RNCs perform functions which include assigning and managing radio resources, and operate as an access point with respect to the core network.

A primary function of UTRAN is constructing and maintaining a radio access bearer (RAB) for a call connection between the terminal and the core network. The core network applies quality of service (QoS) requirements of end-to-end to the RAB, and accordingly, UTRAN can satisfy the QoS requirements of the end-to-end by constructing and maintaining the RAB.

The RAB service is divided into an Iu bearer service and a radio bearer service of a lower concept. The Iu bearer service handles reliable user data transmission between boundary nodes of UTRAN and the core network, while the radio bearer service handles reliable user data transmission between the terminal and UTRAN.

In the UMTS, traffic is classified as four QoS classes according to its characteristics as follows: conversational class, streaming class, interactive class and background class. The conversational class is a type of symmetric traffic requiring minimum fixed delay, allowing no buffering and offering guaranteed bit rate. The streaming class is a type of an asymmetric traffic requiring minimum variable delay, allowing buffering and offering guaranteed bit rate. The interactive class is a type of an asymmetric traffic requiring moderate variable delay, allowing buffering and offering no guaranteed bit rate. The background class is a type of an asymmetric traffic requiring big variable delay, allowing buffering and offering no guaranteed bit rate FIG. 2 illustrates a radio protocol between the terminal and UTRAN on the basis of the 3GPP wireless access network standards.

With reference to FIG. 2, the radio protocol is vertically formed of a physical layer, a data link layer and a network layer, and is horizontally divided into a user plane for transmitting data information and a control plane for transmitting a control signal.

The user plane is a region to which traffic information of a user such as voice or an IP packet is transmitted. The control plane is a region to which control information such as an interface of a network or maintenance and management of a call is transmitted.

In FIG. 2, protocol layers can be divided into a first layer (L1), a second layer (L2) and a third layer (L3) based on three lower layers of an open system interconnection (OSI) standard model well known in a communication system.

The first layer (PHY) provides an information transfer service to the upper layer by using various radio transfer techniques.

The first layer is connected to the MAC layer through a transport channel, and data is transferred between the MAC layer and the PHY layer through the transport channel.

The MAC layer provides a re-allocation service of the MAC parameter for allocation and re-allocation of radio resources.

The MAC layer is connected to the radio link control (RLC) layer through a logical channel, and various logical channels are provided according to the kind of transmitted information. In general, when information of the control plane is transmitted, a control channel is used. When information of the user plane is transmitted, a traffic channel is used.

The MAC is classified into an MAC-b sublayer, an MAC-d sublayer and an MAC-c/sh sublayer according to types of managed transport channels. The MAC-b sublayer manages a BCH (Broadcast Channel) handling broadcast of system information, while the MAC-c/sh sublayer manages common transport channel such as FACH (Forward Access Channel), DSCH (Downlink Shared Channel), or the like, common to other terminals.

In UTRAN, the MAC-c/sh sublayer is positioned at a controlling RNC (CRNC) and manages channels shared by every terminal in a cell, so that one MAC-c/sh sublayer exists in each cell.

The MAC-d sublayer manages a DCH (Dedicated Channel), a dedicated transport channel for a specific terminal. Accordingly, the MAC-d sublayer is positioned at a serving RNC (SRNC) managing a corresponding terminal, and one MAC-d sublayer exists also at each terminal.

A radio link control (RLC) layer supports a reliable data transmission and may perform a function of segmentation and concatenation of an RLC service data unit (SDU) coming from a upper layer. The RLC SDU transferred from the upper layer is adjusted in its size according to a throughput capacity at the RLC layer, to which header information is added, and then transferred in a form of a PDU (Protocol Data Unit) to the MAC layer. The RLC layer includes an RLC buffer for storing the RLC SDU or the RLC PDU coming from the upper layer.

A broadcast/multicast control (BMC) layer performs functions of scheduling a cell broadcast message (CB) transferred from the core network and broadcasting the CB to UEs positioned in a specific cell(s). At the side of UTRAN, the CB message transferred from the upper layer is combined with information, such as a message ID, a serial number or a coding scheme, and transferred in a form of BMC message to the RLC layer and to the MAC layer through a CTCH (Common Traffic Channel), a logical channel. In this case, the logical channel CTCH is mapped to a FACH (Forward Access Channel), a transport channel, and an S-CCPCH (Secondary Common Control Physical Channel), a physical channel.

A packet data convergence protocol (PDCP) layer is an upper layer of the RLC layer, allowing data to be transmitted effectively on a radio interface with a relatively small bandwidth through a network protocol such as the IPv4 or the IPv6. For this purpose, the PDCP layer performs a function of reducing unnecessary control information, which is called a header compression, and in this respect, RFC2507 and RFC3095 (robust header compression: ROHC), a header compression technique defined by an Internet standardization group called an IETF (Internet Engineering Task Force), can be used. In these methods, because the only information requisite for the header part of a data is transmitted, control information is transmitted, so that an amount of data transmission can be reduced.

The RRC layer positioned in the lowest portion of the third layer (L3) is defined only in the control plane and controls the logical channels, the transport channels, and the physical channels in relation to the setup, the reconfiguration, and the release of the RBs. The RB signifies a service provided by the second layer for data transmission between the terminal and UTRAN, and setting up the RB means processes of stipulating the characteristics of a protocol layer and a channel, which are required for providing a specific service, and setting the respective detailed parameters and operation methods.

A cell broadcast service (CBS) related to the BMC layer will now be described.

A service that a message including a character or a numeric is given and taken between terminals or between a terminal and a network is called a short message service (SMS). The SMS is classified into a cell broadcast SMS (SMS-CB) for transmitting the same message to one or more cells and a point-to-point SMS (SMS-PP).

The CBS service, which broadcasts plural CBS messages to every user of a specific area, corresponds to the SMS-CB.

CBS messages are broadcast to a geographical area called a broadcast area. This area includes one or more cells or is wholly constructed as a public land mobile network (PLMN). Each CBS message is broadcast to the geographical area according to a mutual contract between an information provider and a PLMN operator.

The BMC messages used at the BMC protocol includes a CBS message for transmitting user information, a scheduling message for allowing a terminal to easily receive a CBC message, and a CBS41 message for transmitting a short message service (SMS) message transmitted from an ANSI41 network. Every message is transmitted from UTRAN only to the terminal. The terminal performs a discontinuous reception (DRX) function by using information of the scheduling message transferred from UTRAN, thereby reducing a battery consumption.

The scheduling of a BMC message is divided into a first level scheduling and a second level scheduling. The first level scheduling determines (allocates) a frame for transmitting a data of a common traffic channel (CTCH).

FIG. 3 illustrates a first level scheduling method. The numbers of the first line indicates a system frame number (SFN) value.

The logical channel CTCH is mapped to the physical channel (S-CCPCH) through the transport channel (FACH). The first level scheduling previously designates a frame of the physical channel by which data of the logical channel (CTCH). Data transmitted to the CTCH is transmitted by a certain consecutive M number of frames, and the frame group is repeated by certain period (N) of frames.

For example, as shown in FIG. 3, data transmitted by the CTCH is always transmitted for two consecutive frame intervals and repeated by the period of six frames. A frame group transmitting the CTCH data starts when the SFN value is 'K' and is repeated by the period (N). In FIG. 3, the frame group starts when the SFN value is '2' and is then repeatedly transmitted by the period of '6'.

The first level scheduling is performed in the same manner on every service of the CBS. That is, as for every service of the CBS, the same cell is allocated with the same frame. The first level scheduling is performed at the RRC layer and the values N, K and M are included in the system information and broadcast to the terminal.

The second level scheduling divides the frame allocated in the first level scheduling into a CBS schedule period. The second level scheduling is performed at the BMC layer, and the terminal obtains CBS schedule period information by receiving a BMC scheduling message. The BMC scheduling message includes information on a length of the CBS schedule period and a start point of the CBS schedule period.

The length of the CBS schedule indicates a length between a start and an end of the CBS schedule period starting after the BMC scheduling message. The start point of the CBS schedule period indicates a different value between a transmission time point of a current BMC scheduling message and a start point of a CBS schedule period starting after the BMC scheduling message.

Thus, as the terminal receiving the CBS message receives the BMC scheduling message, it can recognize when the next CBS schedule period starts and ends. The terminal can obtain the next CBS schedule period information by receiving the BMC scheduling message during the CBS schedule period. In this manner, the terminal can recognize when the BMC message is not transmitted, so that it can perform the discontinuous reception (DRX).

FIG. 4 shows a construction of the BMC scheduling message.

As shown in FIG. 4, the BMC scheduling message provides information on one or plural BMC messages transmitted during the next CBS schedule period. A new message bit map parameter indicates each message transmitted during the next CBS schedule period is a new message or a previously broadcast message. A message explanation parameter indicates a type or an ID of each BMC message transmitted during the next CBS schedule period. At this time, the message refers to one of a CBS message, a scheduling message and a CBS41 message.

The maximum length of the CBS message is generally limited to 1230 octet, so that the CBS message is not suitable for broadcasting or multicasting multimedia data. In addition, because the CBS message is broadcast to every terminal existing in a specific cell, a multicast for providing a service to a specific terminal group is not available wirelessly.

Therefore, in order to broadcast or multicast the multimedia data to a specific terminal group wirelessly, a new service called a multimedia broadcast/multicast service (MBMS) has been proposed.

The MBMS will now be described.

The MBMS is a service for transmitting multimedia data such as audio, video or image data to plural terminals by using a unidirectional point-to-multipoint bearer service. The MBMS is divided into a broadcast mode and a multicast mode. That is, the MBMS is divided into an MBMS broadcast service and an MBMS multicast service.

The MBMS broadcast mode is a service for transmitting multimedia data to every user in a broadcast area. The broadcast area means a broadcast service available area. One or more broadcast areas may exist in one PLMN, one or more broadcast services can be provided in one broadcast area, and one broadcast service can be provided to several broadcast areas.

The MBMS multicast mode is a service for transmitting multimedia data only to a specific user group existing in a multicast area. The multicast area means a multicast service available area. One or more multicast areas can exist in one PLMN, one or more multicast services can be provided in one multicast area, and one multicast service can be provided to several multicast areas.

In the multicast mode, a user is requested to join a multicast group to receive a specific multicast service. At this time, the multicast group refers to a user group that receives the specific multicast service, and joining refers to a behavior of being admitted to the multicast group intending for receiving the specific multicast service.

Two types of logical channels are provided for MBMS data transmission: MBMS Control Channel (MCCH) and MBMS Traffic Channel (MTCH). The MCCH channel is used to transmit MBMS control information to MBMS terminals. The MTCH is used to transmit data of a specific MBMS service to MBMS terminals. Therefore, if multiple MBMS services are available in a cell, multiple MTCH should be configured in the cell. In case of the multicast mode, the MTCH is configured only at the MBMS terminals that have joined the specific MBMS service.

The MAC layer adds an MAC header to the received MBMS data and transfers it to the physical layer of the base station through the common transport channel. And then, the MBMS data undergoes coding and modulation in the physical layer and is transmitted to the terminal through the common physical channel. At this time, the common transport channel transfers the data by a certain time unit of Transmission Time Interval (TTI), and the common physical channels mapped to the common transport channel are transmitted by the frame unit.

In order to simultaneously receive several services transferred through plural channels, the most simple method is to receive several channels simultaneously, which, however, makes the terminal complicate.

Thus, in order to solve the problem, in the conventional CBS service, a scheduling method is adopted in which a time during which a specific service is provided is predetermined and informed. This method is useful in case of simultaneously receiving the MBMS and a different service or the MBMS and control information. In addition, while the MBMS is not being received, the terminal may perform a discontinuous reception (DRX) to prevent battery consumption.

However, in the case of the conventional CBS service, only one service is provided in one cell so the same scheduling parameter is set in the cell. Meanwhile, in the case of the MBMS, various services are to be provided in one cell, so a different scheduling method from the scheduling of the CBS is required.

The above references are incorporated by reference herein where appropriate for appropriate teachings of additional or alternative details, features and/or technical background.

SUMMARY OF THE INVENTION

Therefore, an object of the present invention is to provide a transmission scheduling method suitable for a wireless access network broadcasting and compromise multicasting high speed data with various characteristics.

Another object of the present invention is to provide a multimedia service providing method in which data transmission time is set different for MBMS services so that a different service or a different channel can be received at time when a specific MBMS service data is not transmitted.

To achieve at least the above objects in whole or in parts, there is provided a multimedia service data scheduling method of a wireless communication system providing a multimedia broadcast/multicast service (MBMS) to a terminal group consisting of plural terminals, including: designating a radio resource of a wireless channel for transferring specific MBMS data; and transferring the designated radio resource information to a terminal group for every MBMS.

The multimedia service data scheduling method additionally includes a step in which each terminal of a terminal group receives multimedia service data on the basis of the transmitted radio resource information.

Preferably, the radio channel is a common physical channel.

Preferably, the radio resource is scheduling information indicating a time at which MBMS data is to be transmitted.

Preferably, different radio resources are allocated for different MBMS data.

Preferably, the radio resource is designated when UTRAN sets or resets a radio bearer (RB) for a specific MBMS.

Preferably, the radio resource is periodically or non-periodically allocated when an RB for a specific MBMS is set.

Preferably, the terminal receives MBMS data during a time indicated by frame allocation information.

Preferably, the terminal receives a control signal during a time other than the time indicated by the frame allocation information.

Preferably, the terminal stops receiving every service data during a time other than the time indicated by the frame allocation information.

Preferably, the terminal receives other service data than MBMS service during a time other than the time indicated by scheduling information.

Preferably, the radio resource is designated by a radio resource control (RRC) layer or by a multimedia layer.

Preferably, when the radio resource is designated by the radio resource control (RRC) layer, the radio resource is transmitted in a frame form.

Preferably, the radio resource is transferred to the terminal group through a broadcast channel or a control channel.

Preferably, if the radio resource is designated by the multimedia layer, the radio resource is added in an MBMS scheduling message to be transmitted.

Preferably, different MBMS scheduling messages are transferred to the terminal group through different channels.

Preferably, the channel is a common traffic channel.

Preferably, the MBMS scheduling message includes a sequence number or an identifier and scheduling information of specific MBMS data to be broadcast or multicast next.

Preferably, the MBMS scheduling message can be transferred periodically several times while the specific MBMS is provided.

Preferably, the MBMS scheduling message indicates whether corresponding MBMS data is first transmitted or has been repeatedly transmitted.

Preferably, the MBMS scheduling message is transferred several times non-periodically while the specific MBMS is provided.

Preferably, the MBMS scheduling message indicates a length of an MBMS schedule term and a length between a start point and an end point of the MBMS schedule term.

To achieve at least these advantages in whole or in parts, there is further provided a multimedia service providing method of a wireless communication system providing a multimedia service to a terminal group consisting of plural terminals, including: allocating a frame for a specific multimedia service; transferring frame allocation information to a specific terminal group; and receiving multimedia service data by each terminal group on the basis of the frame allocation information.

Preferably, the multimedia service is a multimedia broadcast/multicast service (MBMS).

Preferably, the frame is a frame of a common physical channel through which specific multimedia service data is to be transmitted.

Preferably, different multimedia service data are allocated to different frames.

Preferably, the frame is allocated when a radio bearer (RB) for a specific MBMS is set or reset.

Preferably, the frame is periodically or non-periodically allocated when an RB has been set for a specific MBMS.

Preferably, the frame is allocated by a radio resource control (RRC) layer.

Preferably, the frame indicates a time at which a specific MBMS data is to be transmitted.

Preferably, the frame allocation information indicates a time interval for which a specific MBMS data is transmitted and a period that the time interval is repeated.

Preferably, the terminal group receives MBMS data during the time indicated by the frame allocation information.

Preferably, the terminal group receives a control signal at a certain time other than the time indicated by the frame allocation information.

Preferably, the terminal group stops receiving every service data for a certain time other than the time indicated by the frame allocation information.

Preferably, the frame allocation information is transferred through a broadcast channel and a control channel.

To achieve at least these advantages in whole or in parts, there is further provided a multimedia service providing method of a wireless communication system providing a multimedia service to a terminal group consisting of plural terminals, including: independently performing a data transmission scheduling for each multimedia service; transferring the scheduling information to a specific terminal group; and receiving multimedia service data by each terminal of the terminal group on the basis of the scheduling information.

Preferably, the multimedia service is a multimedia broadcast/multicast service (MBMS).

Preferably, the scheduling is performed when UTRAN sets or resets a radio bearer (RB) for a specific multimedia service.

Preferably, the data transmission scheduling is independently performed, and the scheduling information is transferred for every multimedia service.

Preferably, the scheduling information is transferred several times periodically or non-periodically while a radio bearer (RB) for a specific multimedia service is set.

Preferably, the scheduling information is transferred through different common traffic channels.

Preferably, the scheduling information is time information at which a specific data is to be transmitted.

Preferably, the scheduling information is transmitted by being added in an MBMS scheduling message.

Preferably, different MBMS services use different MBMS scheduling messages.

Preferably, different MBMS scheduling messages are transferred to the terminal group through different channels.

Preferably, the MBMS scheduling message includes a sequence number or an identifier and scheduling information of a specific MBMS data to be broadcast or multicast next.

Preferably, the MBMS scheduling message includes information indicating whether the corresponding MBMS data is first transferred or has been repeatedly transmitted.

Preferably, the MBMS scheduling message can be transferred several times periodically while a specific MBMS is provided.

Preferably, the MBMS scheduling message can be transferred several times non-periodically while a specific MBMS is provided.

Preferably, the MBMS scheduling message indicates a length of an MBMS schedule term and a length between a start point and an end point of the MBMS schedule term.

Preferably, the scheduling information is generated by a broadcast and multicast control layer of UTRAN.

Preferably, the broadcast and multicast control layer transfers scheduling information to a lower layer.

Preferably, the scheduling information is transferred to a broadcast and multicast control layer of a specific terminal group.

Preferably, the broadcast and multicast control layer of the terminal transfers the received scheduling information to a lower layer.

Preferably, the terminal group receives multimedia service data during a time period indicated by the scheduling information.

Preferably, the terminal group receives a control signal during other time than a time indicated by the scheduling information.

Preferably, the terminal group receives data of other service than the MBMS during a time other than the time indicated by the scheduling information.

Preferably, the terminal group stops receiving of data of services for a time other than the time indicated by the scheduling information.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 illustrates a first level scheduling method;

FIG. 4 shows a construction of the BMC scheduling message;

FIG. 5 shows an MBMS service transmitting scheme in accordance with the present invention;

FIG. 10 illustrates a process that while a terminal of a terminal group which receives specific MBMS data is receiving MBMS data, it receives a different service;

DETAILED DESCRIPTION OF THE PREFERRED EMBODIMENTS

Figure 1:
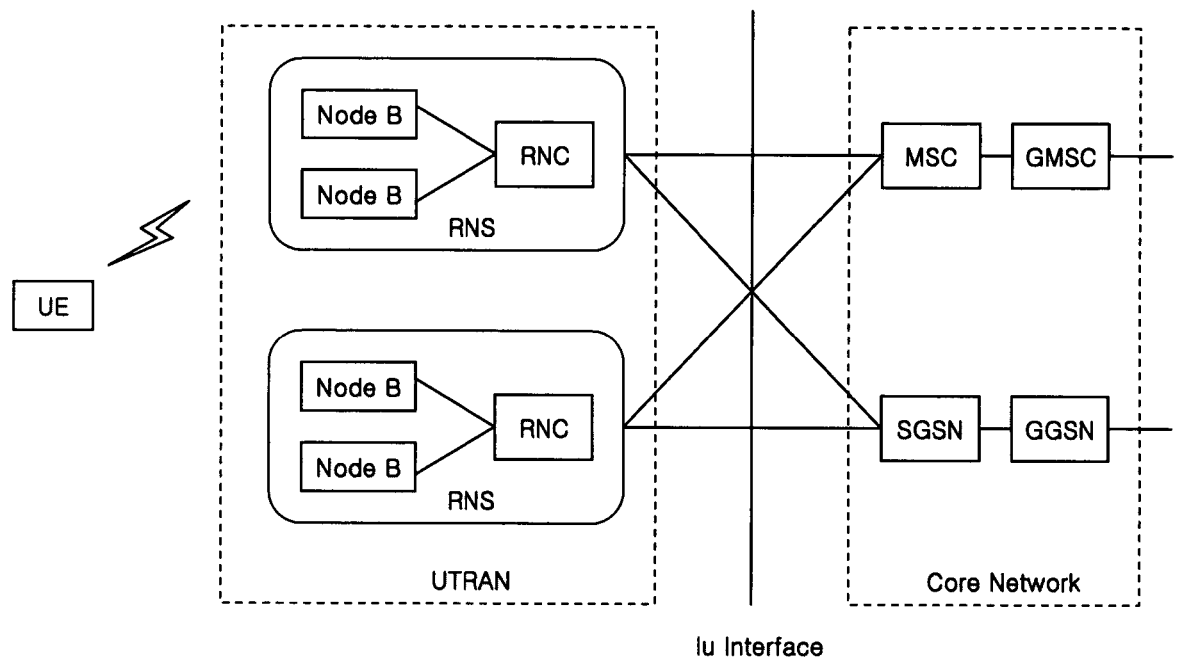
FIG. 1 illustrates a network structure of general UMTS system.
Figure 2:
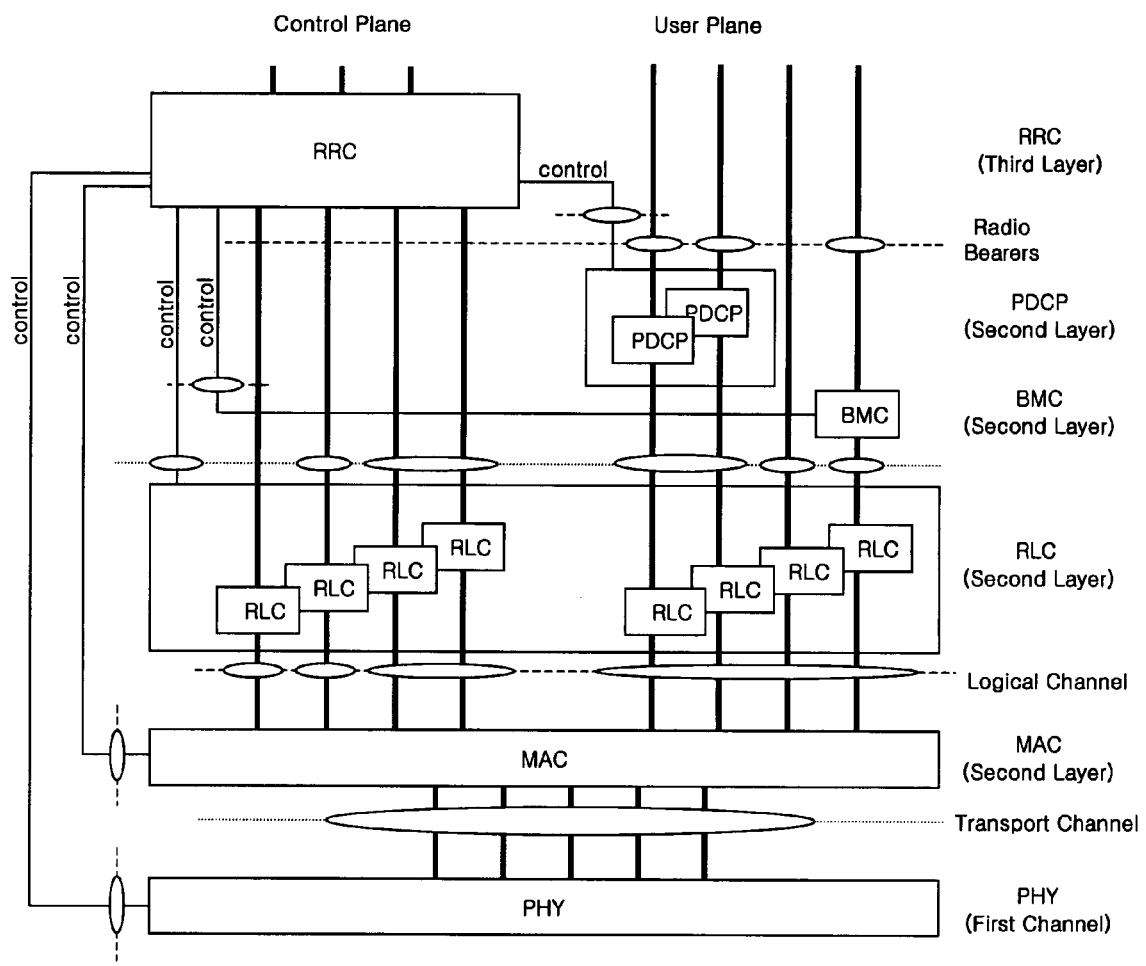
FIG. 2 illustrates a structure of a radio access interface protocol between a terminal and UTRAN on the basis of 3GPP radio access network standards.

The present invention is implemented in a mobile communication system such as UMTS (Universal Mobile Telecommunications System) developed by 3GPP. Without being restricted thereto, the present invention can be also applied to a communication system operated in different standards.

The present invention proposes a method, in a wireless communication system providing multimedia services to a specific terminal group through a common wireless channel, that a radio resource of a common wireless channel for transmitting specific multimedia service data is designated and each specific multimedia service is transmitted to a terminal group.

In the present invention, different MBMS services provided at one cell have different scheduling parameters. The scheduling indicates whether corresponding MBMS service data (referred to as 'MBMS data', hereinafter) is transmitted or not, and the scheduling parameter includes time information indicates time at which a corresponding data is transmitted. Accordingly, different MBMS services can transmit data in different time without overlapping. That is, only one MBMS service is provided at one time section.

In the present invention, a wireless network designates a certain time at which MBMS service data is to be transmitted for each MBMS service and transfers corresponding time information to the terminal group which desired to receive a specific MBMS service.

Therefore, terminals belong to the terminal group may receive other service or other channel while the specific MBMS data is not transmitted. If there is no other MBMS service or other channel while the MBMS data is not transmitted, the terminals belonging to the corresponding terminal group turn to an idle state to prevent a battery consumption.

In the present invention, if the QoS type of MBMS services is categorized as the background class, UTRAN can transmit more than one MBMS services through a specific physical channel or a specific transport channel. Accordingly, UTRAN should determine whether it schedules transmission of MBMS services on a physical/transport channel or not, based on a QoS type of the MBMS services before setting up the MBMS services in a cell. If the QoS type of the MBMS services is all the background class, UTRAN transmits different MBMS services at different transmission intervals.

The MBMS data transmitting and receiving method of the present invention is divided into a method that a transmission interval is designated at a control plane and a method that the transmission interval is designated at the user plane. The two methods can be independently applied or applied together like the level 1 and level 2 scheduling of CBS. In the case that the two methods are applied together, the method in which the transmission interval is designated at the control plane corresponds to the level 1 scheduling of CBS, while the method in which the transmission interval is designated at the user plane corresponds to the level 2 scheduling of CBS.

In the case that the control plane designates the transmission interval, the third layer protocol such as RRC controls transmission/reception of MBMS data or allocation of a transmission interval. Meanwhile, in the case that the user plane designates the transmission interval, the second layer protocols such as PDCP, RLC and MAC controls transmission/reception of MBMS data or allocation of a transmission interval.

In general, the MBMS service is divided into a streaming type service and a background type service. the present invention proposes a method that, in a cell providing plural background type MBMS services, a specific downlink MBMS channel dividedly provides plural background type MBMS services at each different time.

That is, in the present invention, UTRAN discriminates the streaming type MBMS service and the background type MBMS service, collects the background type MBMS services, time-multiplexes them at a specific MBMS channel, and downwardly transmits them. At this time, the plural time-multiplexed services do not overlap each other at the same time. The specific download MBMS channel refers to a transport channel or a physical channel.

As for the plural services that are time-multiplexed and transmitted, UTRAN control transmission and reception of each service. That is, UTRAN transfers time information indicating when data of each service is transmitted or not to the terminals.

In the present invention, if the QoS type of MBMS services is categorized as the background class, UTRAN can transmit more than one MBMS services through a specific physical channel or a specific transport channel. Accordingly, UTRAN should determine whether it schedules transmission of MBMS services on a physical/transport channel or not, based on a QoS type of the MBMS services before setting up the MBMS services in a cell. If the QoS type of the MBMS services is all the background class, UTRAN transmits different MBMS services at different transmission intervals.

FIG. 5 shows an MBMS service transmission method in accordance with the present invention. Plural background type services (MBMS service 1 and MBMS service 2) are transmitted on one channel by the time-multiplexing method. In this respect, one channel refers to a transport channel or a physical channel.

Designating of the Transmission Interval of the MBMS Data Through the Control Plane The radio resource control (RRC) layer of UTRAN first determines a certain time at which specific MBMS data is to be transmitted. That is, UTRAN RRC determines a frame of a common physical channel for transmitting the specific MBMS data. For example, the UTRAN RRC determines a time section at which the specific multimedia service data are consecutively transmitted and a time interval repetition period. The time interval indicates the number of frames of a consecutive frame group in which the specific multimedia service data is transmitted. The time interval repetition period indicates an interval between a start of a certain consecutive frame group and a start of the next consecutive frame group.

This method is similar to the first level scheduling of the conventional CBS service. However, the scheduling of the present invention is different from the conventional scheduling in the aspect that different scheduling parameters are set for MBMS services provided in one cell.

Figure 6:
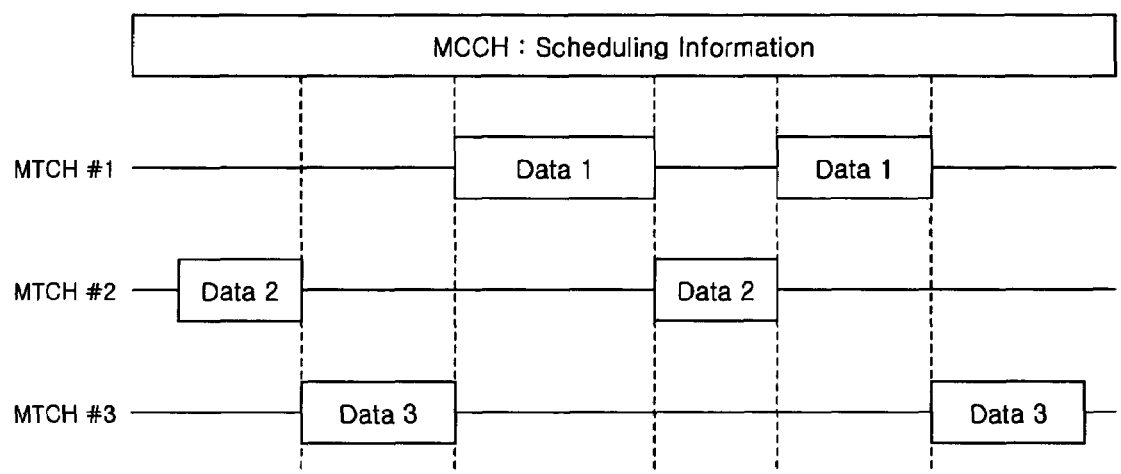
FIG. 6 shows an example of MBMS scheduling message.

FIG. 6 shows an example of an MBMS scheduling in accordance with the present invention.

With reference to FIG. 6, logical channels for transmitting MBMS data (MTCH#1, MTCH#2 and MTCH#3) provide different MBMS services of the background class. Each logical channel sends user data of each MBMS service. A logical channel for transmitting MBMS control information (MCCH) provides scheduling information of different MBMS services.

FIG. 6 shows how the MTCHs are allocated to radio frames or transmission time intervals. As shown in FIG. 6, UTRAN can allocate data1 of MTCH#1, data2 of MTCH#2 and data3 of MTCH#3 to different radio frames or transmission time intervals. UTRAN transmits scheduling information including allocation through the MCCH to terminals. Thus, terminals can acquire information about when data of one or more MBMS services in which they are interested will be transmitted through an MTCH by receiving the scheduling information through the MCCH.

A process that the RRC layer of UTRAN determines a certain time at which the specific MBMS data is to be transmitted and sets an actual data transmission.

Figure 7:
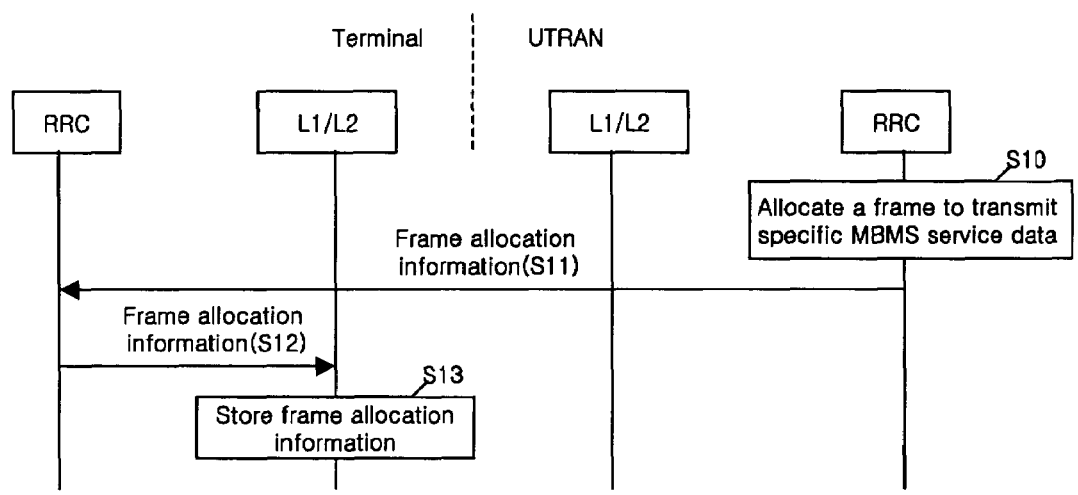
FIG. 7 illustrates a time information setting method for transmitting MBMS data through a control layer.

FIG. 7 illustrates a time information setting method for transmitting MBMS data through a control layer.

As shown in FIG. 7, the UTRAN RRC allocates a frame of a physical channel for transmitting the specific MBMS data (step S10). That is, the UTRAN RRC determines a frame for the specific MBMS service, and transfers corresponding frame allocation information to a lower layer (the physical layer).

In addition, the UTRAN RRC transfers the frame allocation information to an RRC of a terminal group which desired to receive the corresponding MBMS service. In this case, the frame allocation information can be transferred by using the control plane through a broadcast channel (BCCH) or a control channel (CCCH or DCCH).

The terminal RRC of the terminal group transfers the received frame allocation information to physical layers of each terminal (step S12), and then, physical layers of each terminal store the received frame allocation information, whereby setting of transmission time information of the MBMS data through the control layer is completed (step S13).

The time information setting process of FIG. 7 is performed when UTRAN sets or resets a radio bearer (RB) for a specific MBMS service.

In a different embodiment, the time information setting process can be dynamically performed while data of the specific MBMS service is being transmitted. That is, while the RB for the specific MBMS service is set, the wireless system can perform the time information setting process several times periodically or non-periodically.

In the present invention, a terminal, which receives data of the specific MBMS service, can also receive a signal or data of a different MBMS service or a signal or data of a different service besides the MBMS.

Figure 8:
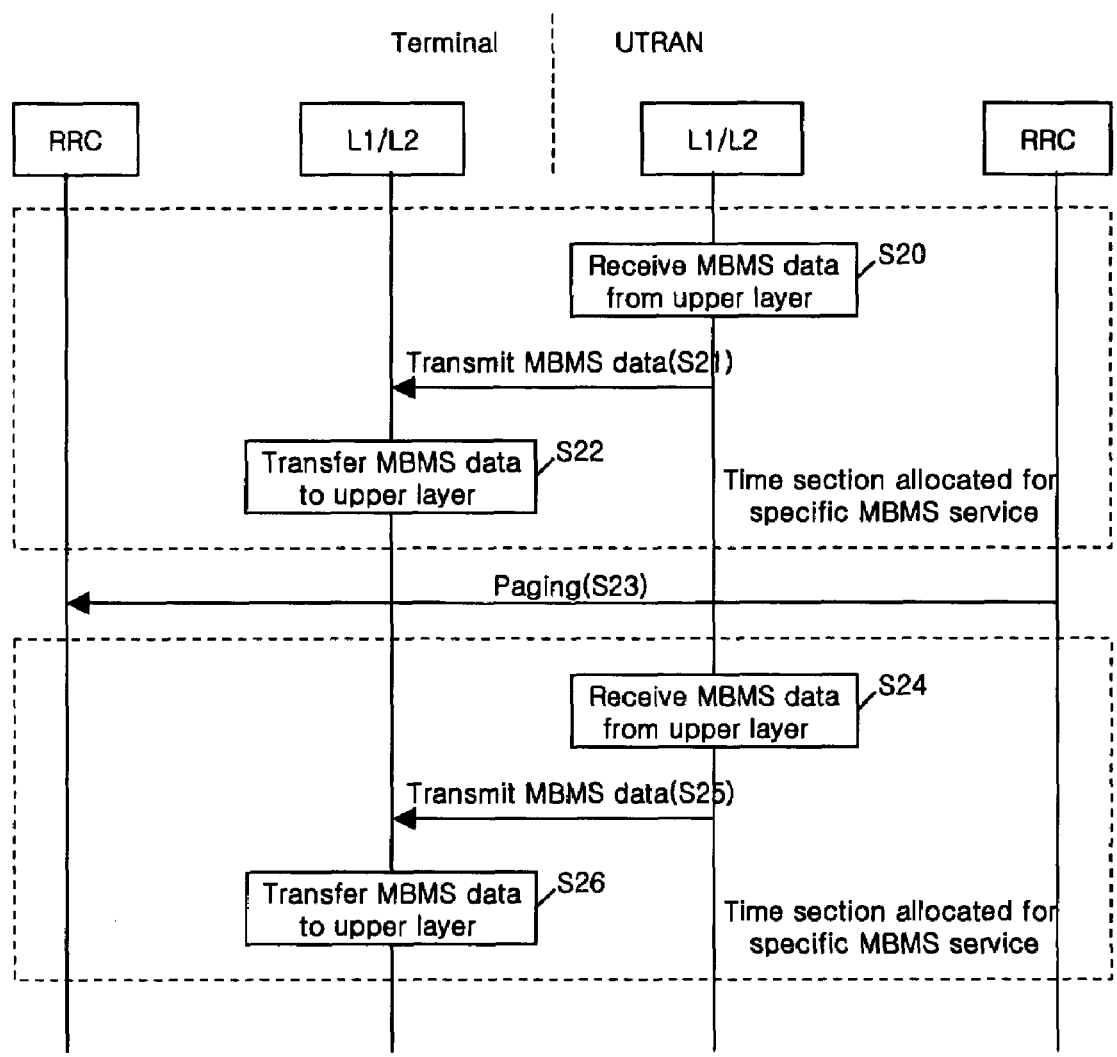
FIG. 8 illustrates a process that while a terminal of a terminal group which receives specific MBMS data is receiving MBMS data, it receives a control signal.

FIG. 8 illustrates a process that a terminal of the terminal group receives paging information between receiving MBMS data.

The process is on the assumption that a frame for a specific MBMS service has been already allocated through the process of FIG. 7.

The physical layer of UTRAN receives MBMS data for the specific MBMS service from a upper layer and transfers it (steps S20 and S21). At this time, UTRAN controls the MBMS data to be transmitted only in the allocated frame.

The physical layer of the terminal belonging to the terminal group receiving the corresponding MBMS service receives the MBMS data in the frame corresponding to the previously stored frame allocation information and transfers it to the high layer of the user plane (step S22).

For other frame which does not correspond to the previously stored frame allocation information, the terminal group can receive other channel than the MTCH channel for the specific MBMS service. UTRAN RRC transfers a paging signal to an RRC of a terminal belonging to the terminal group. At this time, UTRAN transfers the paging signal during a time section available for the terminal to receive, that is, at other time than the time section allocated for the specific MBMS service (step S23). The paging signal is transmitted and received by using the service of the RLC, MAC and the physical layer positioned at a lower side of the RRC.

Thereafter, the steps S24~S28 are repeatedly performed for the time section allocated for the specific MBMS service and the terminal belonging to the terminal group receives the MBMS data.

The terminal may perform the discontinuous reception (DRX) or receive the control signal such as paging or services other than the MBMS, such as a short message service (SMS) message, at a time section other than the time section allocated for the specific MBMS service.

Designating of Transmission Section of MBMS Data Through Control Plane

When MBMS data is to be transmitted through the control plane, the multimedia broadcast and multicast control layer (referred to as 'multimedia layer', hereinafter) of UTRAN determines a certain time at which the specific MBMS data is to be transmitted. That is, the multimedia layer determines a frame of the common physical channel for transmitting the specific MBMS data, and constructs an MBMS scheduling message similar to the conventional BMS scheduling message.

Unlike the conventional art in which only one BMS scheduling message is generated in one cell, in the present invention, the MBMS scheduling message is generated as many as MBMS services in one cell. Namely, different MBMS services provided in one cell use different MBMS scheduling messages.

An MBMS scheduling message for a specific MBMS service is transmitted to the terminal group through a MTCH. Thus, different MBMS scheduling messages for different MBMS services are transmitted to the terminal group through different MTCHs.

One MBMS scheduling message includes a sequence number, an identifier or transmission time information of a specific MBMS data to be broadcast or multicast. A terminal of the terminal group receives the MBMS scheduling message and interprets which data is to be received next and which frame the data is in. Then, on the basis of the interpreted information, the terminal effectively performs a receiving process therein.

In order to guarantee a reliability of transmission of the MBMS data, UTRAN may repeatedly transmit the same data. In this case, the MBMS scheduling message may inform whether the corresponding MBMS data is first transmitted or has been repeatedly transmitted. While a specific MBMS is provided, the MBMS scheduling message can be transmitted several times periodically or non-periodically. In this case, information of the transmitted MBMS scheduling message may differ at each time.

In one embodiment, the MBMS scheduling message is constructed as follows.

While an RB is set for the specific MBMS service, the MBMS scheduling message is transmitted several times by a certain period. A first transmitted MBMS scheduling message (M1) transfers transmission information of MBMS data until the next MBMS scheduling message (M2) is transmitted. That is, for a specific MBMS service, M1 transfers transmission information of MBMS data between time points when M1 and M2 are transferred.

The terminal group periodically receives the MBMS scheduling message and recognizes whether there is data to be received until the next scheduling message is transmitted. The period of the MBMS scheduling message is determined by the wireless system and transferred to the terminal group when the MBMS RB is set or reset.

In another embodiment, the MBMS scheduling message is constructed as follows.

While the RB is set for the specific MBMS service, the MBMS scheduling message is transmitted several times non-periodically. Like the BMC scheduling message, the MBMS scheduling message includes a length of the MBMS schedule term and start point information of the MBMS schedule term. The length of the schedule term indicates a length between a start and an end of the MBMS schedule term which starts after the MBMS scheduling message, and the start point of the MBMS schedule term indicates a difference between a transmission time point of the MBMS scheduling message and a start time point of the next MBMS schedule term.

Thus, the terminal receiving the MBMS message can recognize the start and the end of the MBMS schedule term to be started later by receiving the MBMS scheduling message. The terminal obtains the next MBMS schedule term information upon receiving the MBMS scheduling message during the MBMS schedule term.

In this manner, the multimedia layer of UTRAN determines a certain time at which data of the specific MBMS service is to be transmitted, and sets transmission an actual data.

Figure 9:
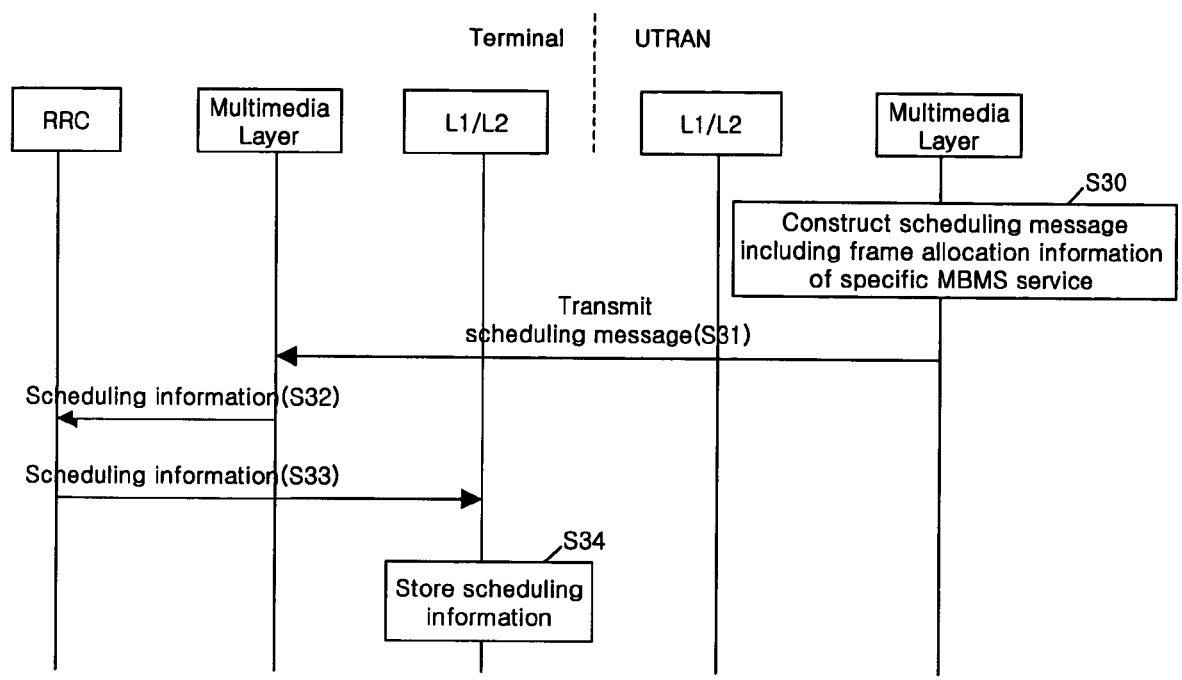
FIG. 9 illustrates a time information setting method for transmitting MBMS data through a user layer.

FIG. 9 illustrates a time information setting method for transmitting MBMS data through a user layer.

As shown in FIG. 9, the multimedia layer of UTRAN constructs an MBMS scheduling message including time information on when specific data is to be transmitted for a specific MBMS (step S30), and transfers it to a multimedia layer of a terminal group which desired to receive the corresponding MBMS (step S31). The MBMS scheduling message is transferred through the lower layer service of the multimedia layer.

The multimedia layer of the terminal interprets the received MBMS scheduling message. The terminal multimedia layer obtains time information (scheduling information) on transmission of specific data to be received from the scheduling message, and transfers the obtained scheduling information to the terminal RRC (step S32). Then, the terminal RRC transfers the scheduling information to the physical layer of the terminal (step S33), and the terminal physical layer stores the scheduling information (step S34). The stored scheduling information is used for reception of specific MBMS data.

The time information setting process of FIG. 9 is generated dynamically while the specific MBMS data transmission is performed. That is, while the RB for the specific MBMS service is set, the wireless system performs the time information setting process several times periodically or non-periodically.

In the present invention, a terminal which receives data of a specific MBMS service can also receive a signal or data of a different MBMS service, or a signal or data of other service than the MBMS.

FIG. 10 illustrates a process that a terminal of a terminal group which receives specific MBMS data receives a different service between receiving MBMS data. This process is on the assumption that the process of FIG. 9 for allocating time information for the specific MBMS has been already performed.

First, a physical layer of UTRAN receives MBMS data for the specific MBMS from a upper layer (step S40) and then transfers the received MBMS data (step S41). At this time, UTRAN controls the MBMS data of the corresponding service to be transmitted according to a content of the scheduling message.

The physical layer of the terminal belonging to the terminal group receiving the corresponding MBMS service receives the MBMS data in a frame indicated by the stored scheduling information, and transfers it to a upper layer (step S42).

During a frame which does not correspond to the stored scheduling information, the terminal group may receive channels other than the MTCH channel for the specific MBMS service. For this purpose, UTRAN may transmit a short message service SMS) message to an RRC of a certain terminal belonging to the terminal group (step S43). Preferably, UTRAN can transmit the SMS message for a time section available for the terminal to receive at a time other than the time section allocated for the specific MBMS service.

Thereafter, the steps S44~S46 of FIG. 10 are repeatedly performed for the time section allocated for the next specific MBMS service, so that the terminal physical layer receives the MBMS data. The terminal may perform a discontinuous reception (DRX) or receive a control signal such as paging or other services than the MBMS such as the SMS message service.

As mentioned above, setup of the time information shown in FIG. 7 is performed only when the RB is set or reset for the specific MBMS service. After the RB is set or reset, setup of the time information is performed several times periodically or non-periodically while the MBMS data is transmitted, as shown in FIG. 9. The frame allocated in FIG. 9 is selectively allocated again among the frames allocated in FIG. 7.

Accordingly, the method of FIG. 7 is used for a static scheduling, while the method of FIG. 9 is used for a dynamic scheduling. UTRAN and the terminal need to perform the processes of FIGS. 7 and 9 before data transmission.

After performing the processes of FIGS. 7 and 9, as shown in FIGS. 8 and 10, the corresponding MBMS data is received for the time section allocated for the specific MBMS service, while the control signal or other data than the specific MBMS service such as the SMS message is received for the non-allocated time section.

As so far described, the conventional CBS scheduling method was devised for receiving a control signal or performing the DRX while receiving the CBS service. This method needs to be applied for the MBMS too, but the method of setting the same scheduling parameter in one cell like the conventional method can not be applied as it is to the MBMS service.

In the present invention, the data transmission time is set to be different for every MBMS service. Accordingly, terminals belonging to a terminal group can receive other service or other channel at a certain time when data of the specific MBMS service is not transmitted. In addition, at the time section when the data of the MBMS service is transmitted, if there is no other service or channel to be received, terminals belonging to the corresponding terminal group becomes in an idle state, so that a battery consumption of the terminal can be prevented.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of transmitting point-to-multipoint service multimedia data in a wireless communications system, the method comprising:
   determining scheduling information for each of a plurality of point-to-multipoint multimedia services, wherein the scheduling information for each point-to-multipoint multimedia service designates transmission start information and transmission duration information that indicates the number of consecutively transmitted frames which contain the multimedia data of the corresponding point-to-multipoint multimedia service;
   transmitting the scheduling information for each of the plurality of point-to-multipoint multimedia services to a corresponding group of mobile terminals, respectively, wherein the scheduling information associated with each point-to-multipoint multimedia service is independent of the scheduling information associated with each of the other point-to-multipoint multimedia services; and
   transmitting the multimedia data for each of the plurality of point-to-multipoint multimedia services in accordance with the independent, corresponding scheduling information such that a mobile terminal associated with the plurality of point-to-multipoint multimedia services is capable of using the scheduling information to determine a time interval between receiving multimedia data associated with one of the point-to-multipoint services and a next one of the point-to-multipoint services in order to operating in Discontinuous Receive Mode.

2. The method as claimed in claim 1, wherein the transmission start information includes a time section and the transmission duration information includes a time interval.

3. The method as claimed in claim 1, wherein the scheduling information associated with a given one of the point-to-multipoint multimedia services further designates information of a next scheduling period, the information of the next scheduling period including an interval between the start of the present point-to-multipoint multimedia transmission and the start of the next point-to-multipoint multimedia transmission.

4. The method as claimed in claim 1, wherein the scheduling information associated with a given one of the point-to-multipoint multimedia services further designates information of a next scheduling period, the information of the next scheduling period including a time interval repetition period.

5. The method as claimed in claim 1, wherein each of the point-to-multipoint multimedia services includes multimedia broadcast and multicast service.

6. The method as claimed in claim 1, wherein the scheduling information for each of the plurality of point-to-multipoint multimedia services is transmitted periodically by the network, separate and independent of the other point-to-multipoint multimedia services, to inform a mobile terminal when each corresponding point-to-multipoint multimedia service is scheduled to be transmitted.

7. A method of discontinuously receiving from a network, multimedia data associated with a point-to-multipoint service in a wireless communications system, the method comprising:
   receiving scheduling information for each of a plurality of point-to-multipoint services, wherein the scheduling information for each point-to-multipoint service designates start information and duration information that indicates a number of consecutively transmitted frames which convey the multimedia data of the corresponding point-to-multipoint service, wherein the scheduling information associated with each point-to-multipoint service is independent of the scheduling information associated with each of the other point-to-multipoint services; and
   receiving the multimedia data associated with each of the plurality of point-to-multipoint services in accordance with the received scheduling information for each point-to-multipoint service, wherein a mobile terminal associated with each of the plurality of point-to-multipoint services is capable of using the received scheduling information to determine a time interval between receiving multimedia data associated with one of the point-to-multipoint services and a next one of the point-to-multipoint services in order to operate in Discontinuous Receiving mode.

8. The method as claimed in claim 7, wherein the start information includes a time section and the duration information includes a time interval.

9. The method as claimed in claim 7, wherein the scheduling information associated with one or more of the plurality of point-to-multipoint services includes next scheduling period information that indicates an interval between the start associate with receiving the present point-to-multipoint multimedia data and the start associated with receiving the next point-to-multipoint multimedia data.

10. The method as claimed in claim 9, wherein the interval associated with the next scheduling period is a time interval repetition period.

11. The method as claimed in claim 7, wherein each of the point-to-multipoint services includes multimedia broadcast and multicast service.

12. The method as claimed in claim 7, wherein the scheduling information for each of the plurality of point-to-multipoint services is received periodically.

13. The method as claimed in claim 7, wherein the received multimedia data includes at least one of audio data, video data and image data.

14. In a wireless communication system, a method for scheduling a plurality of point-to-multipoint services for at least one user terminal associated with each of the plurality of point-to-multipoint services, the method comprising:
   periodically receiving one or more point-to-multipoint scheduling information messages for each of the plurality of point-to-multipoint services via a common logical channel, wherein the logical channel is commonly used for receiving the one or more scheduling information messages for each of the plurality of point-to-multipoint services, thereby informing the at least one user terminal when corresponding point-to-multipoint data associated with each service is scheduled to be transmitted via respective logical channels, wherein the corresponding point-to-multipoint data is transmitted in a common physical channel, and wherein the scheduling information associated with each of the plurality of point-to-multipoint services is independent with respect to the scheduling information associated with each of the other point-to-multipoint services; and
   the at least one user terminal capable of using the scheduling information associated with each of the plurality of point-to-multipoint services to determine a time interval between receiving multimedia data associated with one of the point-to-multipoint services and a next one of the point-to-multipoint services in order to discontinue receiving over the physical channel.

15. The method as claimed in claim 14, wherein the one or more point-to-multipoint scheduling information messages for each of the plurality of point-to-multipoint services comprises a start parameter, expressed in terms of a number of radio frames, indicating a start of the transmission relative to a transmission time interval in which the corresponding point-to-multipoint scheduling information message was received.

16. The method as claimed in claim 14, wherein the one or more point-to-multipoint scheduling information messages for each of the plurality of point-to-multipoint services comprises a duration parameter, expressed in terms of a number of radio frames, indicating a duration of the transmission relative to a transmission time intend in which the one or more sets of corresponding point-to-multipoint scheduling information message was received.

17. The method as claimed in claim 14, wherein the one or more sets of point-to-multipoint scheduling information messages for each of the plurality of point-to-multipoint services comprises a next scheduling period indicating a number of scheduling periods after a current scheduling period in which no data will be transmitted for the corresponding point-to-multipoint service.

18. An apparatus for transmitting point-to-multipoint service data from each of a plurality of point-to-multipoint services, over a wireless network, to at least one mobile terminal associated with each of the plurality of point-to-multipoint services, the apparatus comprising:
    a protocol entity adapted to designate a transmission interval at a control plane by:
        determining scheduling information for each of the plurality of point-to-multipoint services, wherein the scheduling information for each point-to-multipoint service designates start information and duration information that indicates a number of consecutive frames which contain the multimedia data associated with the corresponding point-to-multipoint service, and wherein the scheduling information associated with each of the plurality of point-to-multipoint services is independent of the scheduling information associated with each of the other point-to-multipoint services; and
        transmitting the multimedia data associated with each of the plurality of point-to-multipoint services in accordance with the scheduling information such that the at least one mobile terminal is capable of receiving and then using the scheduling information to determine a time interval between the transmission interval associated with one of the point-to-multipoint services and a transmission interval associated with a next one of the point-to-multipoint services in order to operate in Discontinuous Receiving mode.

19. The apparatus as claimed in claim 18, wherein the start information includes a time section and the duration information includes a time interval.

20. The apparatus as claimed in claim 18, wherein the scheduling information further designates information of a next scheduling period, the next scheduling period information including an interval between the start associated with the present point-to-multipoint data transmission and the start associated with the next point-to-multipoint data transmission.

21. The apparatus as claimed in claim 18, wherein the scheduling information further designates information of a next scheduling period, the information of the next scheduling period including a time interval repetition period.

22. The apparatus as claimed in claim 18, wherein each of the point-to-multipoint services includes multimedia broadcast and multicast service.

23. The apparatus as claimed in claim 18, wherein the scheduling information for each of the plurality of point-to-multipoint services is transmitted periodically by the network to inform the at least one mobile terminal when each corresponding point-to-multipoint service is scheduled to be transmitted.

24. An apparatus for receiving, over a wireless network, multimedia data from each of a plurality of point-to-multipoint services, the apparatus comprising:
    a protocol entity adapted to designate a transmission interval at a control plane by:
        receiving scheduling information for each of the plurality of point-to-multipoint services, wherein the scheduling information for each point-to-multipoint service designates start information and duration information that indicates a number of consecutive frames which contain the multimedia data associated with the corresponding point-to-multipoint service, wherein the scheduling information, including the start information and the duration information, associated with each of the point-to-multipoint services is independent of the scheduling information, including the start information and the duration information, associated with each of the other point-to-multipoint services; and
        receiving the multimedia data associated with each of the plurality of point-to-multipoint services in accordance with the received scheduling information for each point-to-multipoint service, wherein a mobile terminal associated with each of the plurality of point-to-multipoint services receiving the scheduling information corresponding to each of the plurality of point-to-multipoint services is capable of using the received scheduling information, including the start information and duration information, to determine a time interval between receiving multimedia data associated with one of the point-to-multipoint services and a next one of the point-to-multipoint services in order to operate in Discontinuous Receiving mode.

25. The apparatus as claimed in claim 24 wherein the start information includes a time section and the duration information includes a time interval.

26. The apparatus as claimed in claim 24, wherein the scheduling information associated with each of the plurality of point-to-multipoint services includes next scheduling period information, and wherein the next scheduling information indicates an interval between the start associated with the present point-to-multipoint data being received and the start associated with the next point-to-multipoint data to be received.

27. The apparatus as claimed in claim 26, wherein the next scheduling period is a time interval repetition period.

28. The apparatus as claimed in claim 24, wherein each of the plurality of point-to-multipoint services includes multimedia broadcast and multicast service.

29. The apparatus as claimed in claim 24, wherein the scheduling information for each of the plurality of point-to-multipoint services is received periodically.

30. The apparatus as claimed in claim 24, wherein the received multimedia data includes at least one of audio data, video data and image data.

* * * * *